United States Patent
Hoshuyama

(10) Patent No.: US 7,164,620 B2
(45) Date of Patent: Jan. 16, 2007

(54) ARRAY DEVICE AND MOBILE TERMINAL

(75) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/101,170

(22) Filed: Apr. 7, 2005

(65) Prior Publication Data

US 2005/0213432 A1 Sep. 29, 2005

Related U.S. Application Data

(63) Continuation of application No. PCT/JP03/12799, filed on Oct. 6, 2003.

(51) Int. Cl.
*G01S 3/80* (2006.01)
(52) U.S. Cl. ...................... 367/129; 367/901
(58) Field of Classification Search ............... 367/901, 367/129, 126, 123
See application file for complete search history.

(56) References Cited

U.S. PATENT DOCUMENTS

| 6,449,586 B1 | 9/2002 | Hoshuyama |
| 2002/0009203 A1 | 1/2002 | Erten |

FOREIGN PATENT DOCUMENTS

| CA | 2244344 | * | 5/2001 |
| CA | 2404071 | * | 10/2001 |
| JP | 11-052988 | | 2/1999 |
| WO | WO 01/076319 | | 10/2001 |
| WO | WO 2004034734 | * | 4/2004 |

OTHER PUBLICATIONS

International Preliminary Examination Report dated Feb. 2, 2004 for corresponding International Application PCT/2003/12799.
International Search Report dated Nov. 18, 2003 from corresponding international Application PCT/JP2003/12799.
Yoshifumi Nagata, et al., A Study of Noise Reduction Using Two-Channel Adaptive Beamformer, Acoustical Society of Japan Collected Papers, Toshiba Kansai Research Laboratories, Mar. 1997, Japan.
Osamu Hoshuyama, et al., A Robust Adaptive Beamformer With A Blocking Matrix Using Coefficient Constrained Adaptive Filters, Technical Report of the Institute of Electronics, Information and Communication Engineers, CS94-189, DSP94-111(1995-01), Japan.

* cited by examiner

*Primary Examiner*—Daniel Pihulic
(74) *Attorney, Agent, or Firm*—Katten Muchin Rosenman LLP

(57) ABSTRACT

From output of a microphone, a first circuit generates a signal having first directivity which passes, and a second circuit generates a signal having second directivity which conversely cuts off, a signal arriving from a direction of a target sound source to output the obtained signals to a third circuit. Here, with two microphones disposed such that a noise source such as a speaker fails to locate at a position of a null of the second directivity, at the output of the second circuit, a signal arriving from the direction of the target sound source is cut off and a signal arriving from the direction of the noise source is passed. The third circuit corrects the output of the first circuit to output a signal with a signal arriving from the direction of the target sound source emphasized and a signal arriving from the direction of the noise source suppressed.

25 Claims, 21 Drawing Sheets

ARRAY DEVICE AND MOBILE TERMINAL

CROSS-REFERENCE TO RELATED APPLICATION

This application is a continuation of International Application PCT/JP2003/012799 filed on Oct. 6, 2003, now pending, and claims priority from Japanese Patent Application 2002-294661 filed on Oct. 8, 2002, the contents of which are herein wholly incorporated by reference.

FIELD OF THE INVENTION

The present invention relates to an array device which space-selectively receives signals by using a plurality of sensors and, more particular, an optimum sensor arrangement technique.

DESCRIPTION OF THE RELATED ART

In general, an array device is used for receiving only a target signal out of a plurality of signal sources in the field of voice signal acquisition, sonar and radio communication. Used as a sensor are a microphone in a case of voice signal acquisition, an ultrasonic sensor in a case of a sonar and an antenna in a case of radio communication. In the following, description will be made, as an example, of a case of a microphone array using a microphone as a sensor.

With a plurality of microphones disposed at different positions in space, a microphone array executes signal processing by using spatial information such as a phase difference derived from a difference in a propagation path to realize signal separation and noise removal. Basis of signal processing is beam forming (directivity control) which makes use of a difference in propagation delay time.

Basic principle of beam forming will be described with respect to a case of two microphones as an example with reference to FIG. 38. Consider a case where with two omnidirectional microphones whose characteristics are completely the same disposed at a space of d, a plane wave arrives at them from a direction $\Theta$. The plane wave is received by each microphone as a signal whose propagation delay time differs by a path difference $d \sin \theta$. A beam former as a device for conducting beam forming delays one microphone signal by $\delta = d \sin \theta_0 / c$ (c: sound velocity) so as to compensate for a propagation delay related to a signal coming from a certain direction $\theta_0$ and adds or subtracts the obtained output signal to/from other microphone signal.

At an input of an adder, phases of signals coming from the direction $\theta_0$ coincide with each other. Accordingly, at an output of the adder, a signal coming from the direction $\theta_0$ is emphasized. On the other hand, because signals coming from other direction than $\theta_0$ have phases different from each other, they will not be emphasized so much as a signal coming from the direction $\theta_0$. As a result, a beam former using an adder output forms directivity having a beam (direction whose sensitivity is especially high) at the direction $\theta_0$. By contrast, at a subtractor, a signal arriving from the direction $\theta_0$ is completely cancelled. Accordingly, a beam former using a subtractor output forms directivity having a null in the direction $\theta_0$ (direction whose sensitivity is especially low).

Such a beam former as conducts only delaying and addition is referred to as a delay and sum beam former. In addition, beam direction control is referred to as beam steering and null direction control is referred to as null steering. Steering a beam to a target signal direction and steering a null to an unnecessary signal direction enables a target signal to be emphasized and an unnecessary signal to be suppressed.

Although the foregoing is the description with respect to a beam former having a most simple structure including two microphones, a delay unit and an adder-subtractor as an example, increasing the number of microphones and using not only a delay unit but also a common filter achieves higher performance as a matter of course. This is because provision of numbers of microphones increases spatial flexibility to obtain sharp directivity. This is also because using a filter enables a relationship between frequency and directivity to be changed.

Conventional studies of beam forming mostly use methods based on linear signal processing. Beam forming which uses linear processing is roughly classified into two kinds, a fixed type and an adaptive type. The former is called fixed beam forming and the latter is called adaptive beam forming.

Fixed beam forming is beam forming designed based only on knowledge obtained in advance such as a signal arriving direction, whose amount of operation is relatively small and whose realization is easy. Even in a case where a plurality of signal arriving directions are expected, control is relatively easy such as preparing as many filter coefficients as the number of signal arriving directions and switching them. Sharpness of a beam which determines space separation capability is basically governed by a relationship between an array size and a wavelength. For overcoming the basic limitations, a method called super directivity which devises arrangement of not only a beam but also a null is proposed.

Adaptive beam forming is a technique of controlling a null mainly by beam control, which removes noise by adaptively directing a null toward a noise source. As compared with fixed beam forming, it is characterized in having high noise removal performance even when an array size is small or when the number of microphones is small. When an error occurs in a target sound arriving direction, however, the target sound might be removed together with noise. Adaptive beam forming having an countermeasure to such a case is called robust adaptive beam forming because its performance is robust against an error or the like. Proposed are, for example, absorbing various effects of errors by an adaptive filter by using a tap coefficient constraint adaptive filter with a fixed beam former output as an input signal in a blocking matrix of a common side lobe canceller (see e.g. Hoshuyama, et al.,"A Robust Adaptive Beamformer with a Blocking Matrix Using Coefficient Constrained Adaptive Filters", Technical Report of IEICE, The Institute of Electronics, Information and Communication Engneers, 1995, January, CS94-189, DSP94-111, p85–92: hereinafter referred to as Literature 1) and increasing an allowable error in a target direction by estimating a directive dip direction formed by a filter of a beam former as a sound source direction to trail a sound source even when the number of channels is as small as 2ch (see e.g. Hitoshi Nagata et al.,"Study of Noise Suppression Processing by 2ch Beam Former", The Acoustical Society of Japan, Heisei 9, March, 2-P-19, p611–612: hereinafter referred to as Literature 2).

In a microphone array, the larger the number of microphones is, the higher spatial flexibility becomes as described above to improve performance. However, not only the number of microphones themselves but also the numbers of microphone amplifiers, interconnections and AD converters are increased to require more costs. In addition, some of devices to which a microphone array is applied in practice such as a mobile phone inevitably limits the number of microphones that can be disposed due to constraints on space. Under these circumstances, how a high performance microphone array is realized by as less number of microphones as possible is one of problems to be solved in putting an array device into practical use.

Most of conventional approaches aiming at improving such performance as signal separation and noise removal by as small number of microphones as possible are improvements of signal processing algorithms. The above-described Literatures 1 and 2 are among them. While such signal processing algorithms will be important studies from now on, as important as which is an approach from a microphone arrangement and structure. This is because when the number of microphone is small, in a case of the minimum number of two, in particular, spatial flexibility is too low to obtain sharp space separation capability, so that increasing sensitivity in a direction of a target sound source invites an increase in sensitivity in other directions than the target sound source direction, resulting in that satisfactory performance can not be ensured only by the improvement of a signal processing algorithm. Nonetheless, there have been no conventional technique that intends to improve performance by microphone arrangement and structure taking limitations of signal processing algorithms into consideration and even an approach to improve performance from the side of microphone arrangement and structure is not found.

The present invention is proposed taking these circumstances into consideration and its object is to provide an array device intending to improve such performance as signal separation and noise removal through sensor arrangement and structure.

SUMMARY OF THE INVENTION

An array device of the present invention is characterized in that in an array device including a plurality of sensors for detecting a signal of a target signal source, at least one noise source, a first circuit which receives input of an output signal of the plurality of sensors to generate a signal having such first directivity as passes a signal arriving from a direction of the target signal source, a second circuit which receives input of an output signal of the plurality of sensors to generate a signal having such second directivity as cuts off a signal arriving from the direction of the target signal source and a third circuit which emphasizes a signal arriving from the direction of the target signal source by correcting an output signal of the first circuit by using the output signal of the first circuit and an output signal of the second circuit, the plurality of sensors are arranged to prevent the noise source from locating at a position of a null of the second directivity calculated by using the position of the plurality of sensors and the direction of the target signal source (the target signal arriving direction). More specifically, the device has the following structure.

In a first array device which includes two the sensors, the two sensors are disposed such that the noise source fails to locate at a position proximate to a conical surface formed when with a line segment linking the two sensors as an axis, a half line extending from the middle point of the line segment toward the direction of the target signal source is rotated.

In a second array device which includes three or more the sensors, the three or more sensors are disposed such that the noise source fails to locate at a position proximate to all such hyperboloids as include a position of a target signal source with arbitrary two of the sensors as fixed points.

In a third array device which includes two the sensors, the two sensors are disposed such that the noise source fails to locate at a position proximate to such a hyperboloid as includes the position of the target signal source with the two sensors as fixed points.

In a fourth array device which includes three or more the sensors, the three or more sensors are disposed such that the noise source fails to locate at a position proximate to all the conical surfaces formed when with a line segment linking arbitrary two of the sensors as an axis, a half line extending from the middle point of the line segment toward the direction of the target signal source is rotated.

In addition, the mobile terminal of the present invention is a mobile terminal such as a mobile phone or a portable computer having an array device which includes a plurality of sensors for detecting a signal of a target signal source, at least one noise source, a first circuit which receives input of an output signal of the plurality of sensors to generate a signal having such first directivity as passes a signal arriving from a direction of the target signal source, a second circuit which receives input of an output signal of the plurality of sensors to generate a signal having such second directivity as cuts off a signal arriving from the direction of the target signal source and a third circuit which emphasizes a signal arriving from the direction of the target signal source by correcting an output signal of the first circuit by using the output signal of the first circuit and an output signal of the second circuit, in which the plurality of sensors are arranged to prevent the noise source from locating at a position of a null of the second directivity calculated by using the position of the plurality of sensors and the direction of the target signal source (the target signal arriving direction) and the sensor is a voice sensor which picks up transmitted voice and the noise source is a voice output unit which outputs received voice.

In the array device of the present invention, the first circuit receives input of an output signal of the plurality of sensors to generate a signal having such first directivity as passes a signal arriving from a direction of a target signal source, the second circuit receives input of an output signal of the plurality of sensors to generate a signal having such second directivity as cuts off a signal arriving from the direction of the target signal source and the third circuit emphasizes a signal arriving from the direction of the target signal source by correcting an output signal of the first circuit by using the output signal of the first circuit and an output signal of the second circuit. More specifically, because a signal having such sharp directivity as passes a signal arriving from the direction of the target signal source can not be directly generated only by the first circuit, a signal having such second directivity as cuts off a signal arriving from the direction of the target signal source (i.e. having a null in the direction of the target signal source) is separately generated by the second circuit to correct an output signal of the first circuit by an output signal of the second circuit. Here, according to the present invention, because the plurality of sensors are arranged such that a noise source fails to locate at a position of a null of the second directivity, the output signal of the second circuit has a signal arriving from the direction of the target signal source cut off, while having a signal arriving from the direction of the noise source passed. Accordingly, executing such correction processing as subtracting the output signal of the second circuit from the output signal of the first circuit by the third circuit enables generation of a signal with a signal arriving from the direction of the noise source satisfactorily suppressed and a signal arriving from the direction of the target signal source emphasized.

DESCRIPTION OF THE PREFERRED EMBODIMENT

Next, modes of implementation of the present invention will be described in detail with reference to the drawings.

Figure 1:
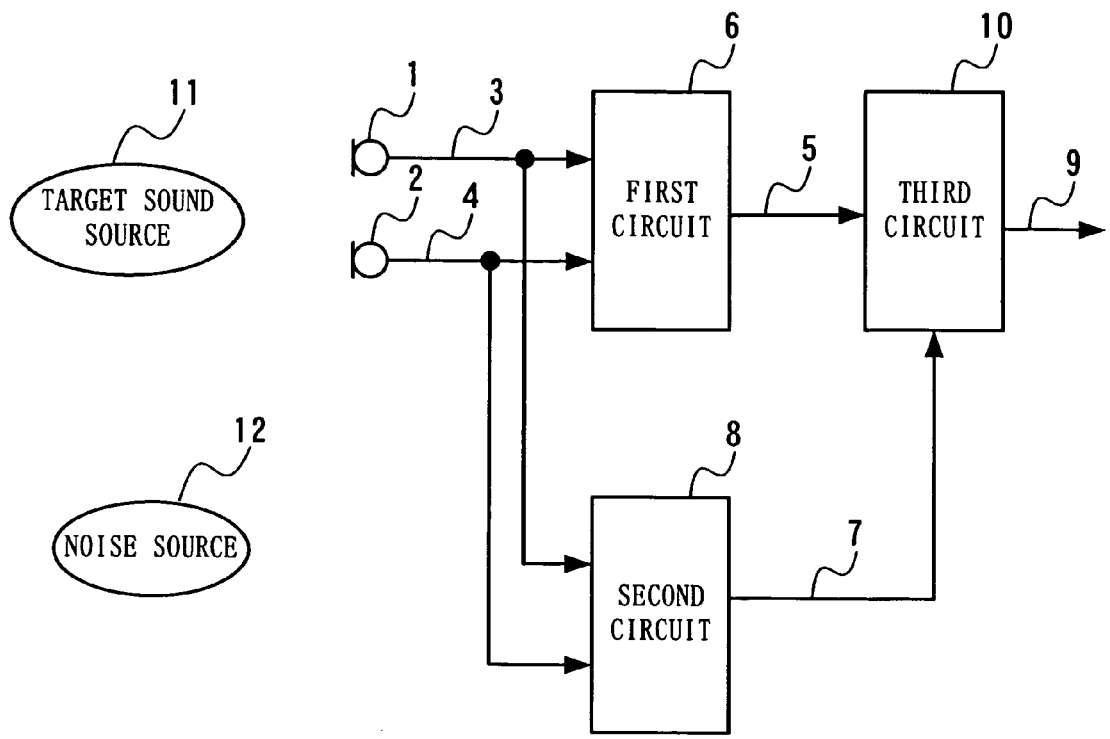
FIG. 1 is a block diagram of one example of a microphone array to which the present invention is applied.

With reference to FIG. 1, one example of a microphone array to which the present invention is applied includes two microphones 1 and 2 which pick up a voice signal of a target sound source 11, a noise source 12, a first circuit 6 which receives input of output signals 3 and 4 of the microphones 1 and 2 to generate a signal 5 having such first directivity as passes a signal arriving from the direction of the target sound source 11, a second circuit 8 which receives input of the output signals 3 and 4 of the microphones 1 and 2 to generate a signal 7 having such second directivity as cuts off a signal arriving from the direction of the target sound source 11, and a third circuit 10 which receives input of the output signal 5 of the first circuit 6 and the output signal 7 of the second circuit 8 to correct the output signal 5 of the first circuit 6, thereby outputting a signal 9 obtained by emphasizing a signal arriving from the direction of the target sound source 11. Assume here that the positions of the target sound source 11 and the noise source 12 are known and the directions of the signals arriving from the target sound source 11 and the noise source 12 are substantially fixed.

As the first circuit 6, the second circuit 8 and the third circuit 10, those used in conventional microphone arrays can be basically used. The first circuit 6, for example, can be realized by a delay and sum beam former which delays and adds the output signals 3 and 4 of the microphones 1 and 2 and a fixed beam former such as a filter and beam former which filters and adds the output signals 3 and 4 of the microphones 1 and 2. The second circuit 8 can be realized, for example, by a blocking matrix which receives input of the output signals of the microphones 1 and 2 to generate and output a signal group with the signal of the target sound source 11 attenuated and other signal than the target signal, that is, the signal of the noise source 12 emphasized by using adaptive signal processing. The third circuit 10 can be realized, for example, by a multi-input canceller which receives the output signal 5 of a fixed beam former forming the first circuit 6 and an output signal group of a blocking matrix forming the second circuit 8 to remove, from a signal obtained by delaying the output of the fixed beam former, a component relative to the output signal group of the blocking matrix. Detailed structure of these fixed beam former, blocking matrix and multi-input canceller are recited, for example, in Japanese Patent No. 3216704.

The microphone array according to the present mode of implementation is characterized in that the microphones 1 and 2 are disposed to prevent the noise source 12 from locating at a position of a null of the second directivity of the second circuit 8 which is calculated by using the positions of the microphones 1 and 2 and the direction of the target sound source 11 (the target signal arriving direction). In the following, the principle of the present invention will be described mainly with respect to this point.

Since the second circuit 8 aims at generating the signal 7 having such second directivity as cuts off a signal arriving from the direction of the target sound source 11, it generates such second directivity by which a null is formed in the direction of the target sound source 11 based on the positions of the microphones 1 and 2 and the direction of the target sound source 11 (the target signal arriving direction). At this time, if the noise source 12 locates at the position of the generated null of the second directivity, the signal 7 which satisfactorily passes a signal from the noise source 12 can not obtained, resulting in failing to obtain at the third circuit 10 the signal 9 with the signal of the noise source 12 satisfactorily suppressed.

In general, since a position proximate to such a hyperboloid as includes the position of the target sound source 11 with the two microphones 1 and 2 as fixed points has a difference in a sound wave propagation path the same as that of the target sound source 11, when the signal of the target sound source 11 is emphasized by processing the output signals 3 and 4 of the two microphones 1 and 2, it will be emphasized as well and conversely, when the signal of the target sound source 11 is suppressed, it will be suppressed as well. Accordingly, in a case where the two microphones 1 and 2 are disposed such that the noise source 12 locates at the position proximate to said hyperboloid, when such second directivity as enables a null to be generated in the direction of the target sound source 11 is generated at the second circuit 8, the noise source 12 will locate at the position of the null. Therefore, it is necessary to arrange the two microphones 1 and 2 to prevent the noise source 12 from locating at a position proximate to said hyperboloid.

If the target sound source 11 and the noise source 12 are sufficiently apart from the two microphones 1 and 2, in place of said hyperboloid, a conical surface which is an asymptotic surface of the hyperboloid can be used as an approximation. The conical surface is a conical surface obtained by, with a line segment linking the two microphones 1 and 2 as an axis, rotating a half line extending from the middle point of the line segment to the direction of the target sound source 11. In the following, using such a conical surface, the principle of the present invention will be described with reference to the drawings. Although the figures showing directivity are used in the following description, since what is important in the description of the principle of the present invention is to which direction a null and a beam of directivity face, the figures showing the directivity are simplified, in which sharpness (thickness) of a null and sharpness of a beam (thickness) do not express actual directivity accurately.

Figure 2:
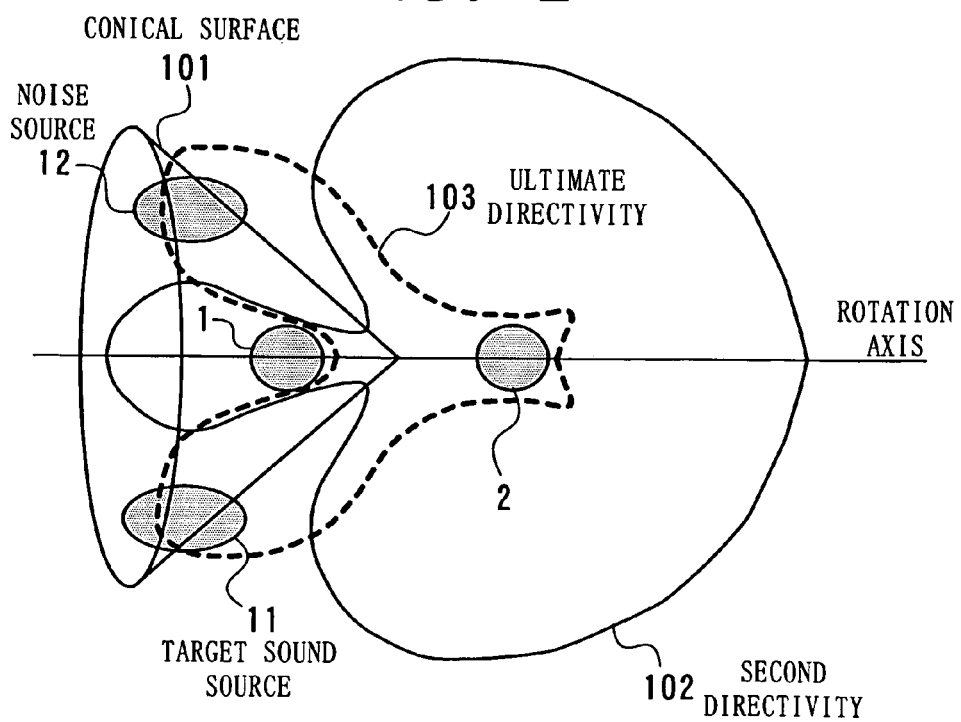
FIG. 2 is a diagram for use in explaining the principle of the present invention.

Now, assume a condition in which the target sound source 11 and the noise source 12 exist at a certain known position as illustrated in FIG. 2. When the two microphones 1 and 2 are arranged, for example, as shown in FIG. 2, a conical surface formed by, with a line segment linking the two microphones 1 and 2 as an axis, rotating a half line extending from the middle point of the line segment toward the direction of the target sound source 11 will be as indicated by the a reference numeral 101 and the noise source 12 will locate in proximity to the conical surface 101. A reference numeral 102 indicates an example of second directivity generated by the second circuit 8, which cuts off a signal from the target sound source 11 by making a null be formed in the direction of the target sound source 11. Directivity generated by the two microphones 1 and 2 will have rotation symmetry with the line segment linking the microphone 1 and the microphone 2 as an axis without fail, which will be line symmetric with respect to the rotation axis seen as a plane as illustrated in FIG. 2. In the microphone arrangement shown in FIG. 2, because the noise source 12 locates in proximity to the conical surface 101, the noise source 12 will locate at a position of the null of the second directivity 102, so that the output signal 7 of the second circuit 8 cuts off not only the signal of the target sound source 11 but also the signal of the noise source 12. As a result, ultimate directivity (directivity of the output signal 9 of the third circuit 10) will be as shown, for example, by a reference numeral 103 to degrade noise removal performance.

Figure 3:
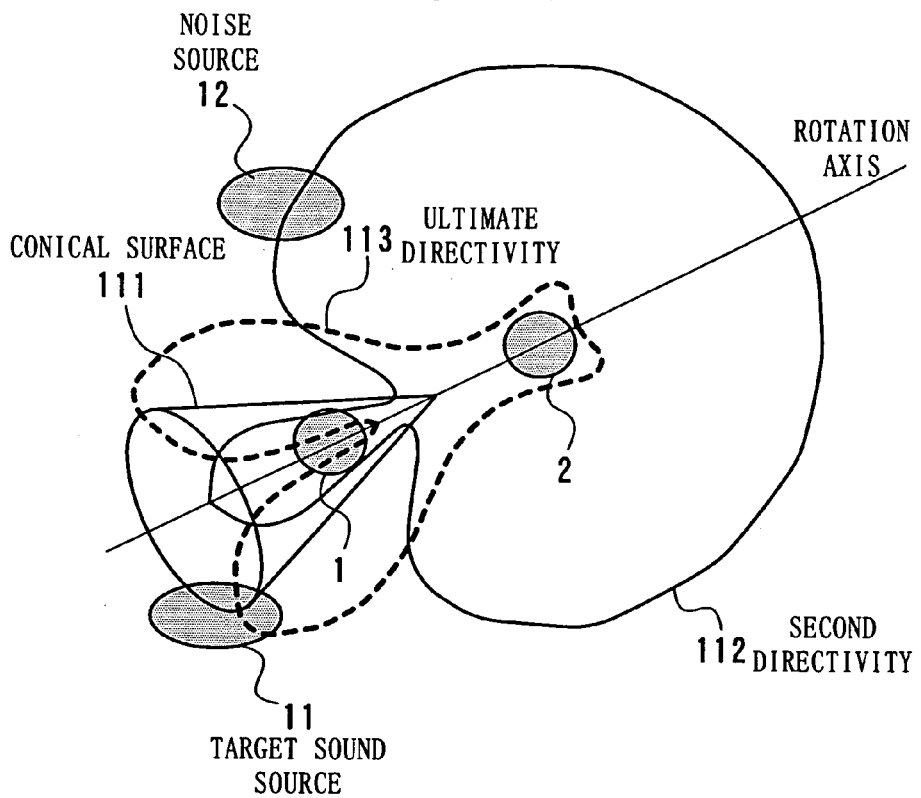
FIG. 3 is a diagram for use in explaining the principle of the present invention.

On the other hand, in a case where the two microphones 1 and 2 are arranged, for example, as shown in FIG. 3, the conical surface will be as indicated by a reference numeral 111 to prevent the noise source 12 from locating in proximity to the conical surface 111. Therefore, when second directivity by which a null is formed in the direction of the target sound source 11, for example, as indicated by a reference numeral 112 is generated by the second circuit 8, because the noise source 12 never locate at the position of the null, the signal from the target sound source 11 can be cut off and the signal from the noise source 12 can be passed. As a result, ultimate directivity will be, for example, as indicated by a reference numeral 113 to obtain satisfactory noise removal performance.

Figure 4:
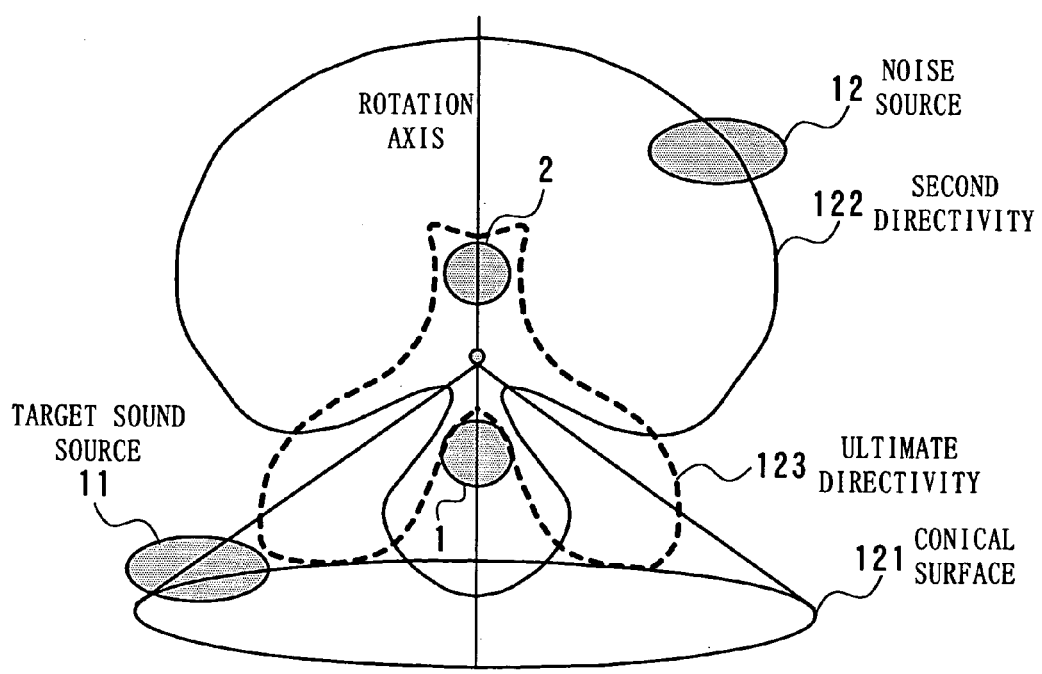
FIG. 4 is a diagram for use in explaining the principle of the present invention.
Figure 5:
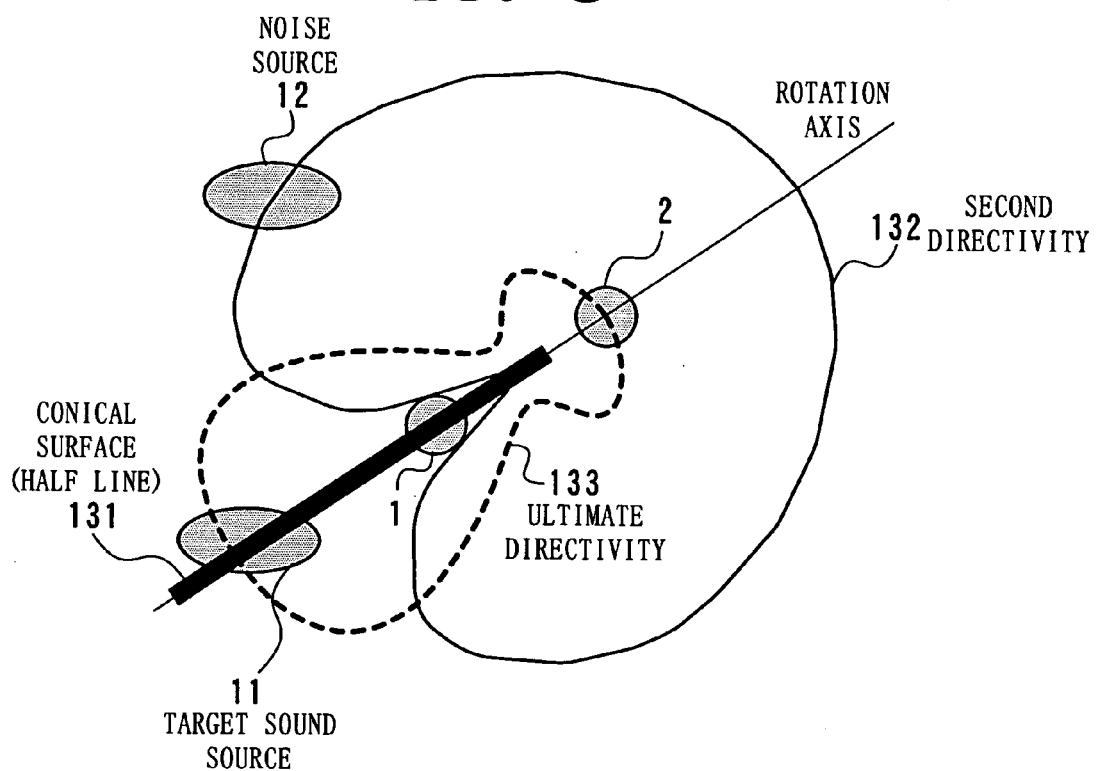
FIG. 5 is a diagram for use in explaining the principle of the present invention.
Figure 6:
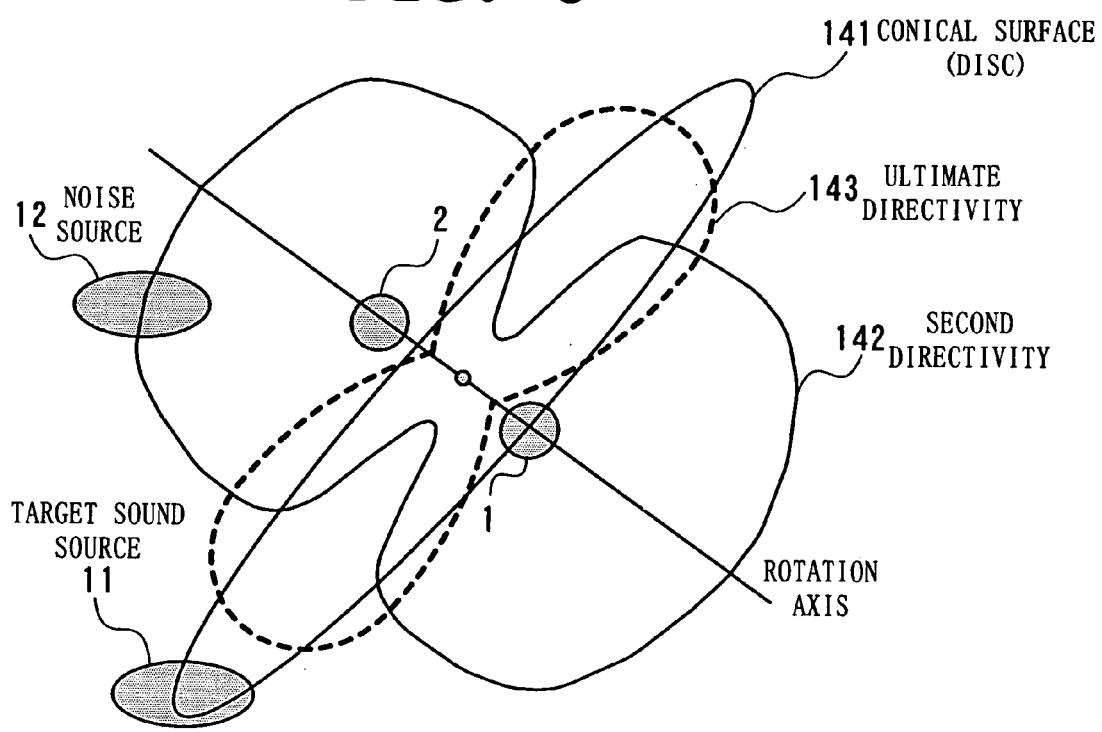
FIG. 6 is a diagram for use in explaining the principle of the present invention.

FIG. 3 shows one example of appropriate arrangement of the microphones 1 and 2 only. Any arrangement in which the noise source 12 fails to locate in proximity to the conical surface as described above is allowable. For example, as shown in FIG. 4, the two microphones 1 and 2 may be disposed between the target sound source 11 and the noise source 12 such that the noise source 12 fails to locate in proximity to a conical surface 121. In this case, forming the second directivity as indicated by a reference numeral 122 results in making ultimate directivity be as indicated by a reference numeral 123. On the other hand, in a case where the microphones 1 and 2 are arranged such that the target sound source 11 locates on the extension of the line segment linking the microphones 1 and 2 as shown in FIG. 5, because a conical surface 131 will be a half line, it is only necessary that the noise source 12 fails to locate in proximity to the half line. In this case, the second directivity will be, for example, as indicated by a reference numeral 132. Furthermore, in a case where the microphones 1 and 2 are disposed such that the target sound source 11 locates on a vertical bisector of the line segment linking the microphones 1 and 2 as illustrated in FIG. 6, a conical surface 141 will be a disc, so that it is only necessary that the noise source 12 fails to locate in proximity to the disc. In this case, the second directivity will be, for example, as indicated by a reference numeral 142 and ultimate directivity will be, for example, as indicated by a reference numeral 143.

Although the principle of the present invention has been described with respect to a conical surface in the foregoing, when the target sound source 11 and the noise source 12 are not sufficiently apart from the two microphones 1 and 2 as in a case where the noise source 12 exists between the two microphones 1 and 2, consideration should be made of a case not of a conical surface but of such a hyperboloid as includes the position of the target sound source 11 with the two microphones 1 and 2 as fixed points as described above. In other words, the two microphones 1 and 2 should be disposed such that the noise source 12 fails to locate at a position proximate to the hyperboloid.

In addition, while the present invention is so far applied to a microphone array using two microphones, the present invention is also applicable to a microphone array using a number n, not less than three, of microphones.

In a case of a microphone array using a number n of microphones, hyperboloids including the position of the target sound source 11 with arbitrary two out of the microphones as fixed points totals $_nC_2$. Because the second directivity can be generated for each pair of arbitrary two microphones, even when the noise source 12 locates at a position proximate to one, two, . . . , a number $_nC_2-1$ of hyperboloids, if the position is not proximate to other hyperboloid, the signal of the noise source 12 will appear in output signals of the two microphones forming other hyperboloid in question. In other words, in a case of a microphone array using a number n of microphones, in general, it is only necessary that said number n of microphones are disposed such that the noise source 12 fails to locate at a position to be proximate from every hyperboloid including the position of the target sound source 11 with arbitrary two microphones as fixed points. On the other hand, when approximation by a conical surface is possible, it is only necessary that said number n of microphones are disposed such that the noise source 12 fails to locate at a position to be proximate from every conical surface formed by rotating, with a line segment linking arbitrary two out of the number n of microphones as an axis, a half line extending from the middle point of the line segment toward the direction of the target sound source 11.

Next, description will be made of a specific example of application of the above-described microphone array according to the present mode of implementation to a mobile phone. In the present specific example, the target sound source 11 corresponds to a mouth of a speaker and transmitted voice is collected by the microphones 1 and 2. The noise source 12 corresponds to a speaker (receiver) which outputs received voice.

Figure 7:
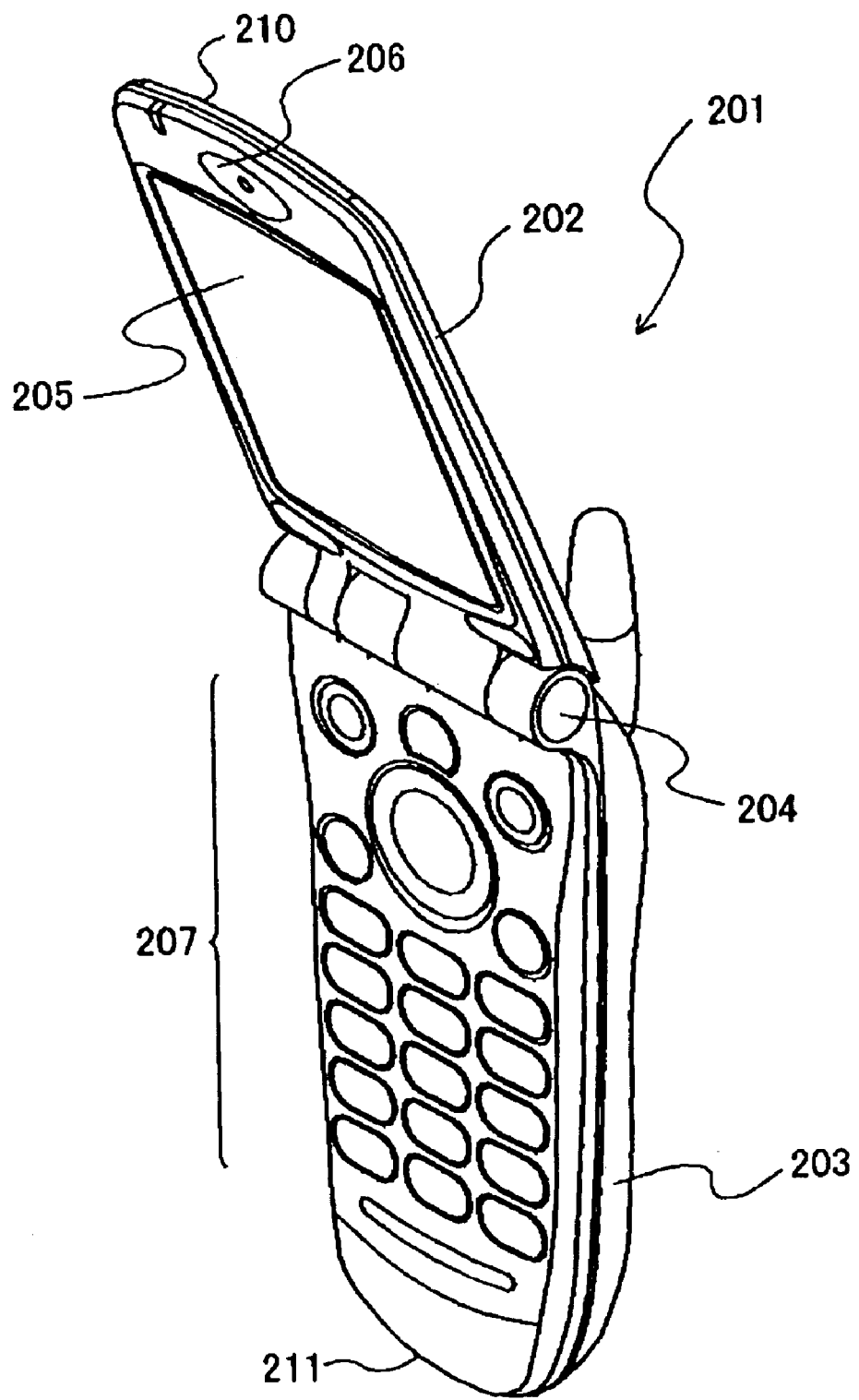
FIG. 7 is an outer perspective view of a folding mobile phone as one specific example to which the present invention is applied.

With reference to FIG. 7, a mobile phone 201 as one specific example of the present invention is a folding mobile phone having an upper casing 202 and a lower casing 203 foldably connected via a hinge 204. In the upper casing 202, disposed from the side proximate to the hinge 204 are a display unit 205 and a speaker (receiver) 206 on a surface facing the lower casing 203 when folded. Disposed in the lower casing 203 is an operation unit 207 on a surface facing the upper casing 202 when folded. An object of the present specific example is to improve sound collecting performance of the mobile phone 201 by arranging the two microphones 1 and 2 in FIG. 1 at an appropriate position in thus structured mobile phone 201 when used either as a handset or as a hands-free phone or used as both as a manner of using an ordinary phone.

Figure 8:
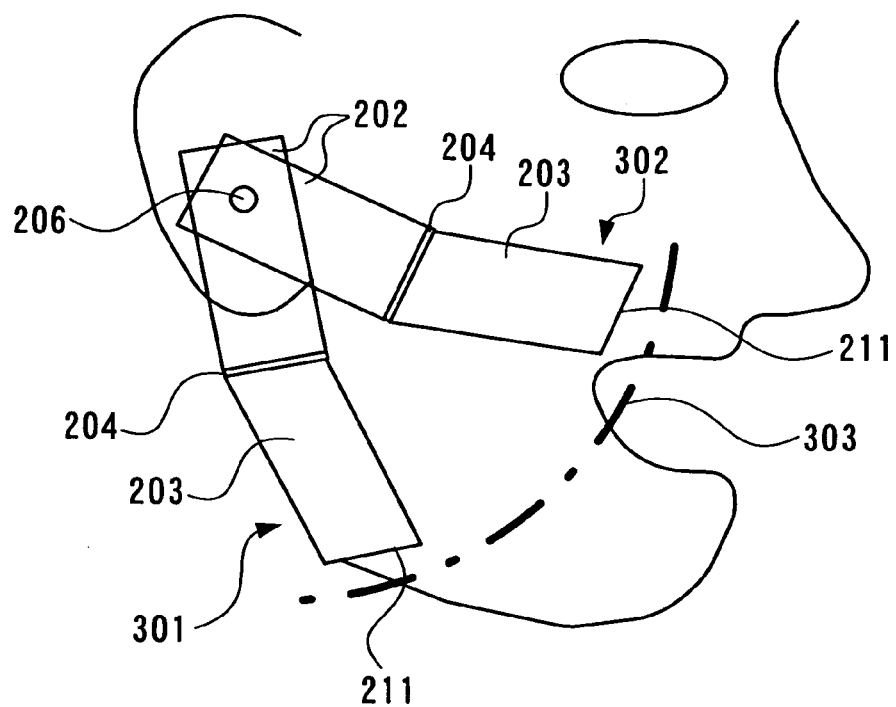
FIG. 8 is a diagram for use in explaining a positional relationship between a speaker's mouth and the mobile phone when the mobile phone is used as a handset.

In general, when a user talks with a partner of telephone conversation by using the mobile phone 201 as a handset, he/she puts the speaker 206 on his/her ear. Accordingly, the position of an end unit 210 of the upper casing 202 of the mobile phone 201 is substantially fixed. On the other hand, although the position of an end unit 211 of the lower casing 203 of mobile phone 201 changes by user's individual habit of holding a mobile phone or the like, it is within a certain range. The schematic diagram of FIG. 8 shows different positions of the mobile phone 201 when the mobile phone 201 is held by the right hand to speak with a partner of telephone conversation with the speaker 206 put on the right ear. State 301 shows a position taken when the end unit 211 of the portable phone 201 is placed near the neck and a state 302 shows a position taken when the end unit 211 is conversely placed near the nose. Dashed line 303 indicates a locus of the end unit 211 of the mobile phone 201 when the position changes from the state 301 to the state 302 or reversely changes. In general, the end unit 211 moves along a sphericity whose radius is a distance from the speaker 206 to the end unit 211 with the speaker 206 put on the ear as the center.

When the mobile phone 201 is used as a handset as described above, while the position of the mobile phone 201 changes to some extent, a range of the change is limited, as long as the configuration of the mobile phone and the position of the speaker 206 are fixed, the position of a speaker's mouth as the noise source 12 can be mostly specified. Therefore, determining a place where the two microphones 1 and 2 are disposed based on the positions of the speaker's mouth and the speaker 206 enables sound collecting performance of the mobile phone 201 when used as a handset to be improved.

Figure 9:
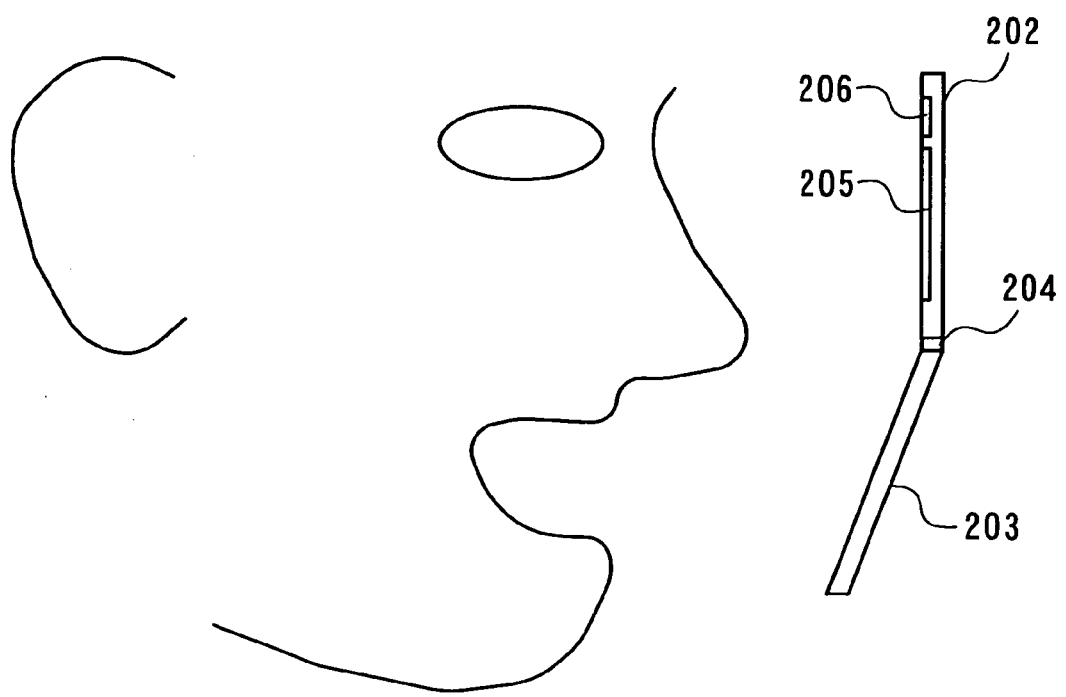
FIG. 9 is a diagram for use in explaining a positional relationship between a speaker's mouth and the mobile phone when the mobile phone is used as a hands-free phone.

On the other hand, when the mobile phone 201 is used as a hands-free phone with the volume of the speaker 206 increased, the position of the mouth can be roughly specified even though not so exactly as in a case of a handset. The reason is that a positional relationship between the mobile phone 201 and the speaker's mouth can be specified to some extent such as speaking while watching a screen and speaking while watching a camera when the camera is provided on the rear surface of the upper casing 202. Typical is a video telephone. In a case of a mobile phone having a video telephone function, the display unit 205 is used as a television screen which displays a face of a telephone conversation partner and as shown in FIG. 9, a user converses while looking at a partner's face by using the hands-free function with the display unit 205 of the mobile phone 201 placed in front of his/her face. In this case, the position of the speaker's mouth is substantially specified.

Figure 10:
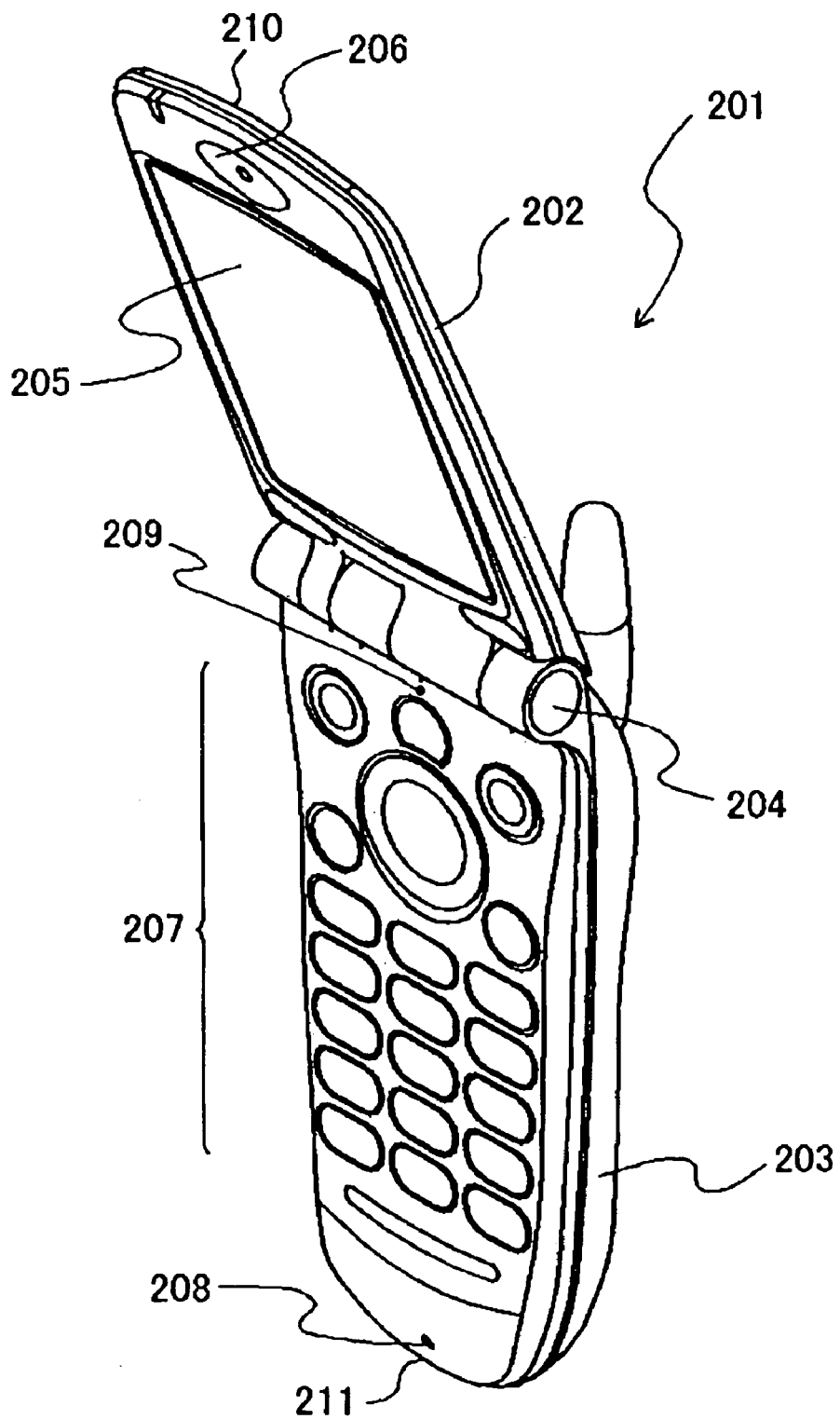
FIG. 10 is an outer perspective view of a folding mobile phone as one specific example to which the present invention is applied.

Example of arrangement of a microphone in the mobile phone 201 shown in FIG. 7 which is suitable both for use as a handset and a hands-free phone is illustrated in FIG. 10. In this example, a first microphone 209 is disposed at a position between the operation unit 207 and the hinge 204 on the surface of the lower casing 203 of the mobile phone 201 and a second microphone 208 is disposed at a position between the operation unit 207 and the end unit 211. In other words, with a direction orthogonal to a longitudinal direction of the hinge 204 as a vertical direction, the two microphones 208 and 209 are disposed in the vertical direction. Also in this example, centers of the two microphones 208 and 209 and the speaker 206 are located on the same surface.

Figure 11:
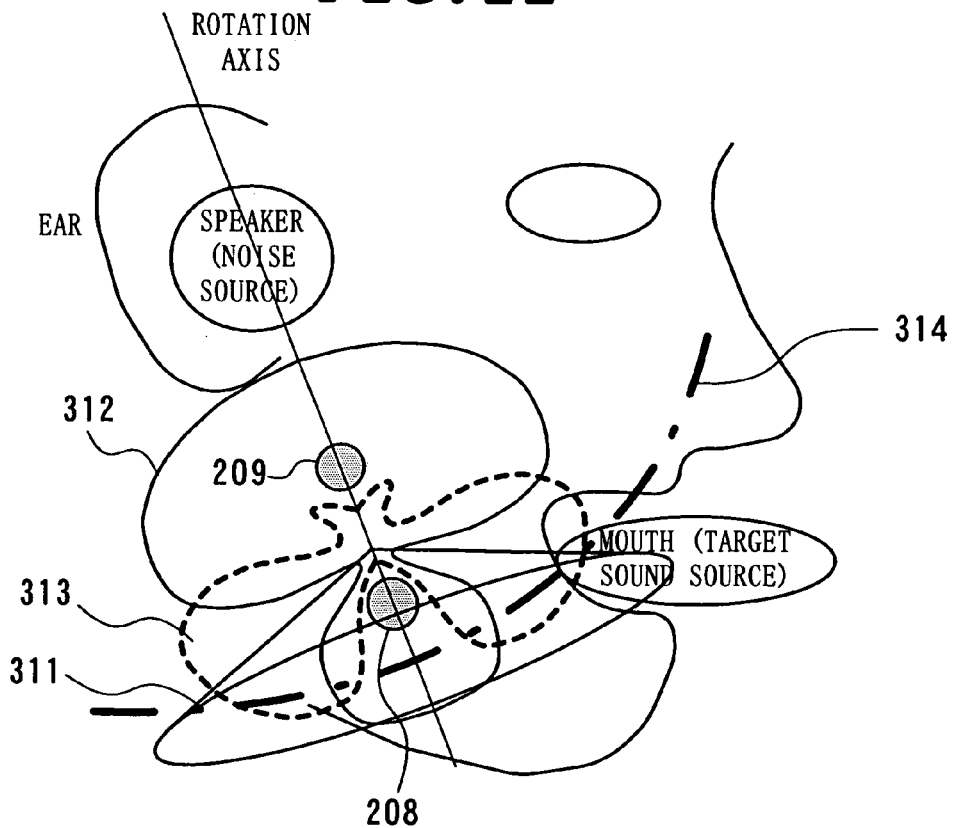
FIG. 11 is a schematic diagram showing a conical surface, second directivity and ultimate directivity obtained when the folding mobile phone as one specific example of the present invention is used as a handset.
Figure 12:
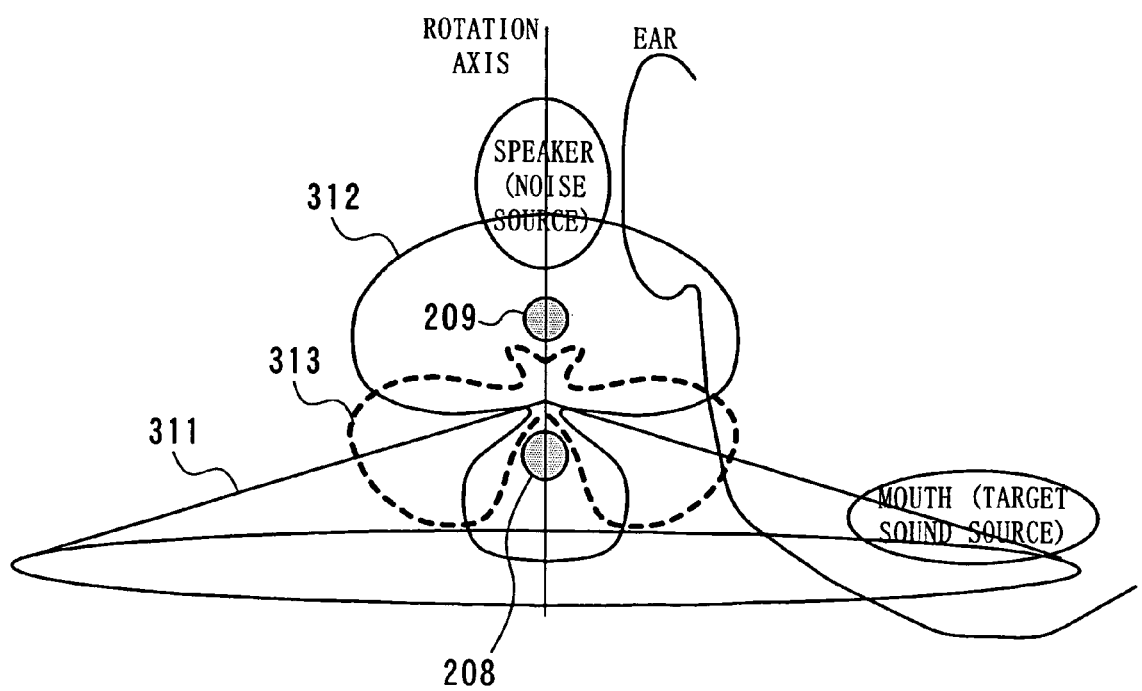
FIG. 12 is a schematic diagram showing a conical surface, second directivity and ultimate directivity obtained when the folding mobile phone as one specific example of the present invention is used as a handset.
Figure 13:
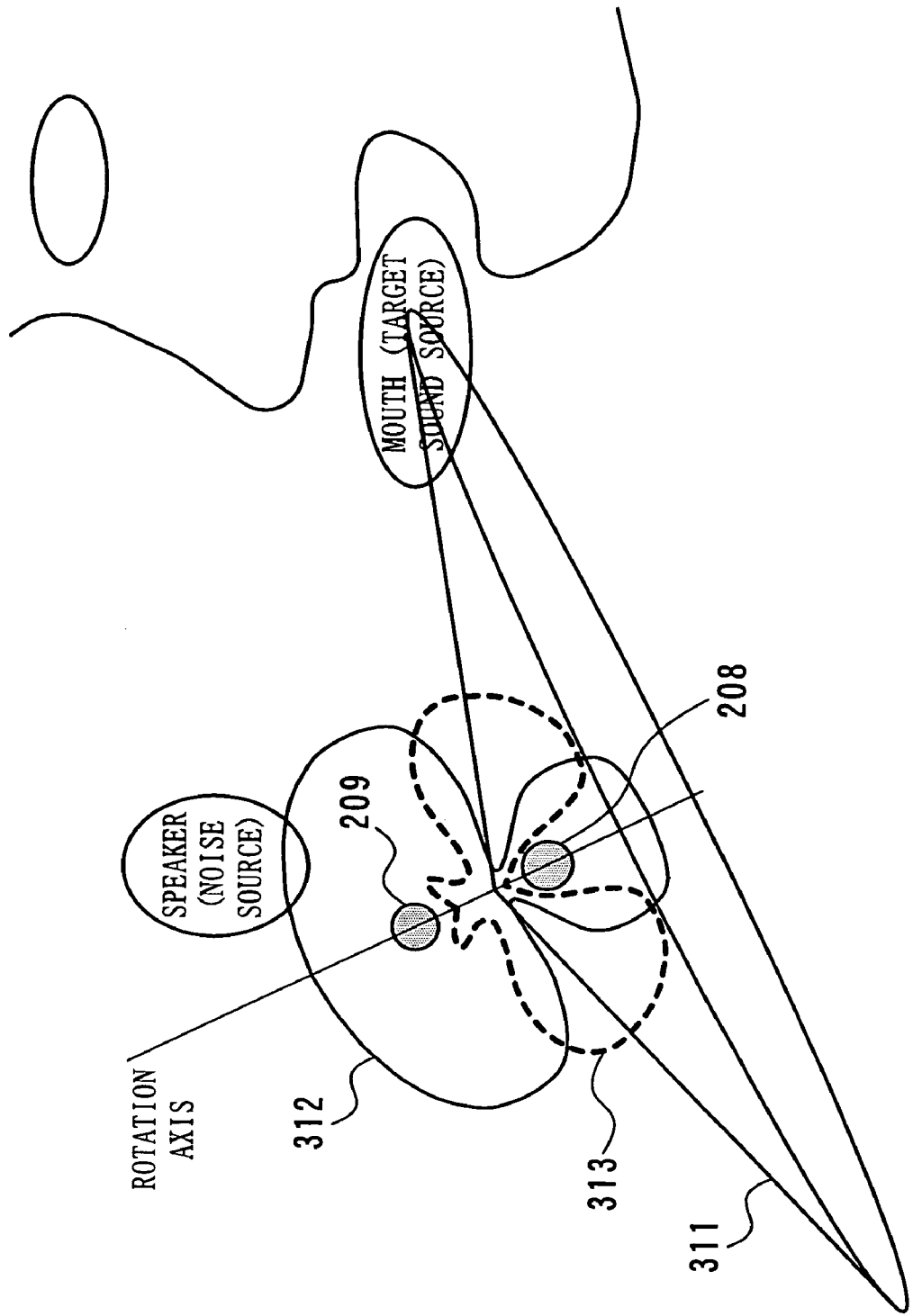
FIG. 13 is a schematic diagram showing a conical surface, second directivity and ultimate directivity obtained when the folding mobile phone as one specific example of the present invention is used as a hands-free phone.

In a case where the two microphones 208 and 209 are disposed in a manner as illustrated in FIG. 10, with a line segment linking the two microphones 208 and 209 as an axis, how a conical surface, second directivity and ultimate directivity are formed by rotating a half line extending from the middle point of the line segment toward the mouth of the speaker as the target sound source 11 at the time of use as a handset and as a hands-free phone are schematically shown in FIGS. 11 to 13. FIGS. 11 and 12 show a case where the mobile phone 201 is used as a handset as illustrated in FIG. 8, with FIG. 11 illustrating the speaker's face seen from the side and FIG. 12 illustrating the speaker's face seen from the front. FIG. 13 shows a state where the mobile phone 201 is used as a hands-free phone as illustrated in FIG. 9. In FIGS. 11 to 13, a reference numeral 313 indicates a conical surface formed, with the line segment linking the two microphones 208 and 209 as an axis, by rotating the half line extending from the middle point of the line segment toward the speaker's mouth. In both the cases of a handset and a hands-free phone, the speaker 206 as the noise source 12 fails to locate in proximity to a conical surface 311.

Accordingly, when the second circuit 8 in the circuit group shown in FIG. 1 which is built in the mobile phone 201 generates such second directivity as indicated by the reference numeral 312 in FIGS. 11 to 13 in which the null is positioned in the direction of the speaker's mouth, the speaker 206 locates at other places than the null. The ultimate directivity obtained at this time by the third circuit 10 is as indicated by the reference numeral 313 in FIGS. 11 to 13, which has a configuration approximate to rotation symmetry with the line segment linking the microphones 208 and 209 as an axis. Therefore, even when the position of the mobile phone 201 changes when used as a handset as described with reference to FIG. 8 to make the end unit 211 of the mobile phone 201 move on a locus 314 (the same locus as the locus 211 in FIG. 8), high sensitivity can be maintained to speaker's voice all the time as can be seen from the direction of the null of directivity 312 and the direction of a beam of the directivity 313 in FIGS. 11 and 12. When used as a hands-free phone with the volume of the speaker 206 increased, the sound of the speaker 206 can be suppressed to collect speaker's voice with high sensitivity as can been seen from the direction of the null of the directivity 312 and the direction of the beam of the directivity 313 in FIG. 13.

Thus, according to the microphone arrangement as a specific example shown in FIG. 10, high sound collecting performance can be obtained both when the mobile phone 201 is used as a handset and when the same is used as a hands-free phone.

Figure 14:
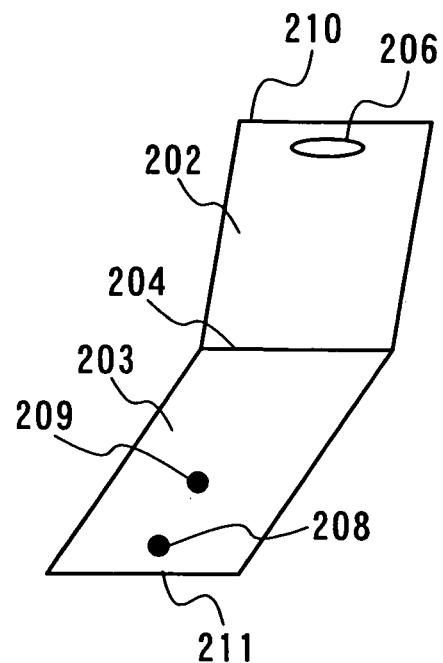
FIG. 14 is a schematic diagram showing a preferred example of a case where a folding mobile phone having a speaker at an upper part of a surface of an upper casing is provided with two microphones arranged on a surface of a lower casing.
Figure 15:
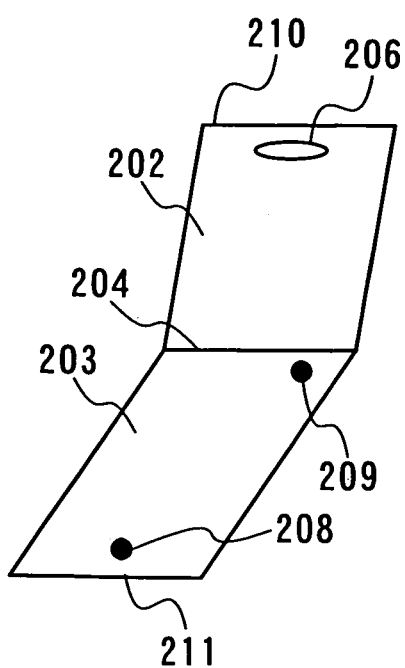
FIG. 15 is a schematic diagram showing a preferred example of a case where a folding mobile phone having a speaker at an upper part of a surface of an upper casing is provided with two microphones arranged on a surface of a lower casing.
Figure 16:
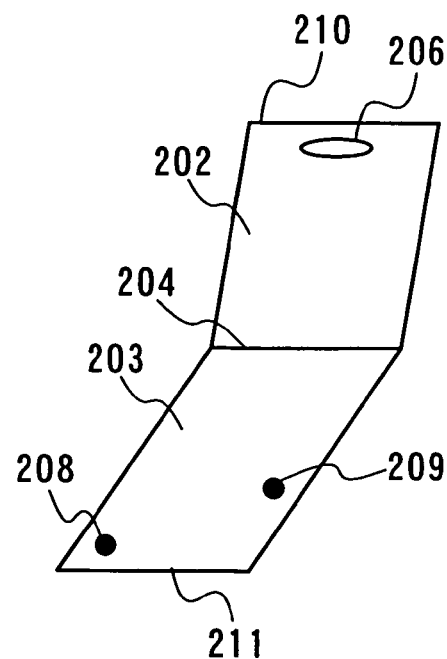
FIG. 16 is a schematic diagram showing a preferred example of a case where a folding mobile phone having a speaker at an upper part of a surface of an upper casing is provided with two microphones arranged on a surface of a lower casing.

The arrangement of microphones which enables the mobile phone 201 shown in FIG. 7 to have increased sound collecting performance when used as a handset and when used as a hands-free phone is not limited to the specific example shown in FIG. 10. For example, although in the specific example in FIG. 10, the two microphones 208 and 209 are vertically aligned on the surface of the lower casing 203 with a long distance provided therebetween, the two microphones 208 and 209 may be vertically disposed on the surface of the lower casing 203 with a short distance provided therebetween as shown in FIG. 14, or the two microphones 208 and 209 may be disposed slantwise on the surface of the lower casing 203 with a long distance provided therebetween as shown in FIG. 15 or they may be disposed slantwise with a short distance provided therebetween as shown in FIG. 16. In general, however, because the larger a phase difference between microphone signals is, the easier signal separation is, those shown in FIGS. 10 and 15 in which the distance between the microphones 208 and 209 is large are more advantageous in terms of performance. On the other hand, in a case where the microphones 208 and 209 are disposed not to have lateral symmetry as shown in FIGS. 15 and 16, designing directivity on the premise that the mobile phone 201 is held by the left hand reduces sensitivity of the microphone 209 when held by the right hand because it is covered by the hand and conversely designing directivity on the premise that the mobile phone is held by the right hand reduces sensitivity when held by the left hand, so that it is advantageous in terms of performance to dispose the two microphones 208 and 209 at a laterally symmetric position as shown in FIGS. 10 an 14 to prevent the hand from covering the microphone.

Figure 17:
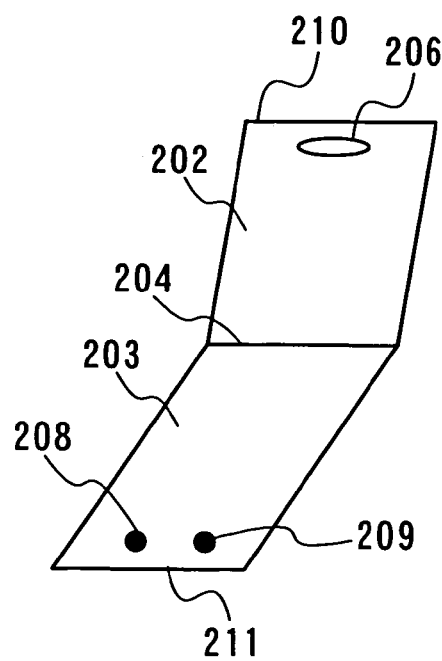
FIG. 17 is a schematic diagram showing an inappropriate example of a case where a folding mobile phone having a speaker at an upper part of a surface of an upper casing is provided with two microphones arranged on a surface of a lower casing.

On the other hand, arranging the two microphones 208 and 209 laterally as shown in FIG. 17 is not desirable. The reason is that within a part of a range of position that the mobile phone 201 can ordinarily take as is described with reference to FIG. 8, the speaker 206 will locate in proximity to a conical surface or a disc formed, with the line segment linking the microphones 208 and 209 as an axis, by rotating the half line extending from the middle point of the line segment toward the speaker's mouth.

Figure 18:
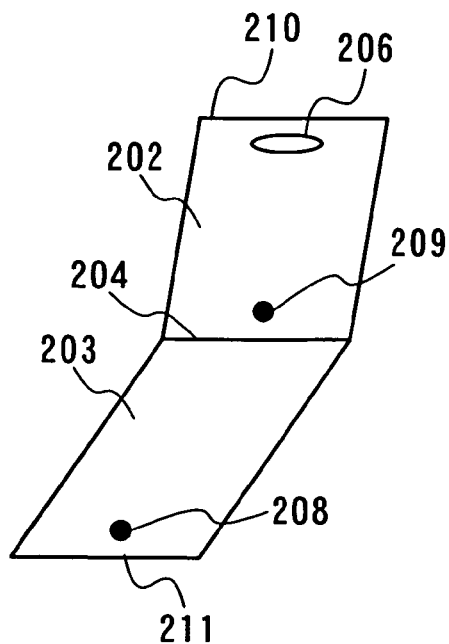
FIG. 18 is a schematic diagram showing a preferred example of a case where a folding mobile phone having a speaker at an upper part of a surface of an upper casing is provided with microphones arranged on each of the surfaces of the upper casing and a lower casing.
Figure 19:
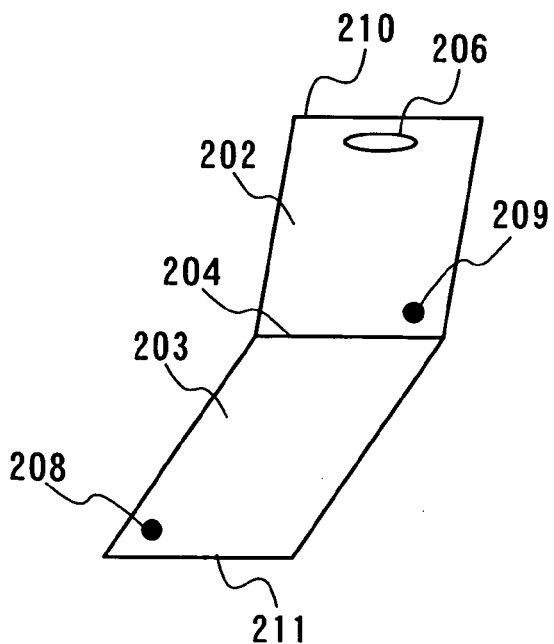
FIG. 19 is a schematic diagram showing a preferred example of a case where a folding mobile phone having a speaker at an upper part of a surface of an upper casing is provided with microphones arranged on each of the surfaces of the upper casing and a lower casing.
Figure 20:
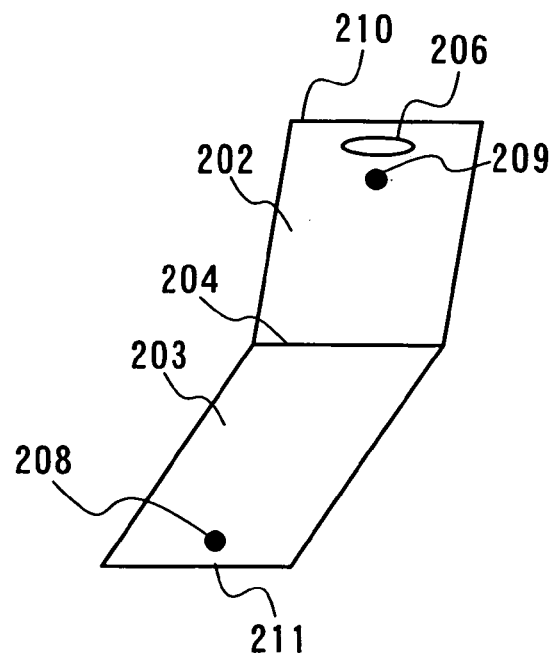
FIG. 20 is a schematic diagram showing a preferred example of a case where a folding mobile phone having a speaker at an upper part of a surface of an upper casing is provided with microphones arranged on each of the surfaces of the upper casing and a lower casing.

Although in the specific examples shown in FIGS. 10, 14, 15, 16 and 17, the two microphones 208 and 209 are disposed on the surface of the lower casing 203, one microphone may be disposed on each of the surface of the lower casing 203 and on the surface of the upper casing 202. Examples of arrangement in this case are shown in FIGS. 18, 19 and 20. In FIG. 18, by disposing one microphone 208 in proximity to the end unit 211 of the lower casing 203 similarly to FIG. 10 and the other microphone 209 in proximity to the hinge 204 of the upper casing 202 (the lower side of the display unit 205), the distance between the microphones 208 and 209 is made larger than that in FIG. 10. Although the microphones 208 and 209 are disposed vertically in FIG. 18, they may be disposed slantwise as shown in FIG. 19 or the microphone 209 may be disposed near the speaker 206 as shown in FIG. 20 to increase a distance between the microphones.

Figure 21:
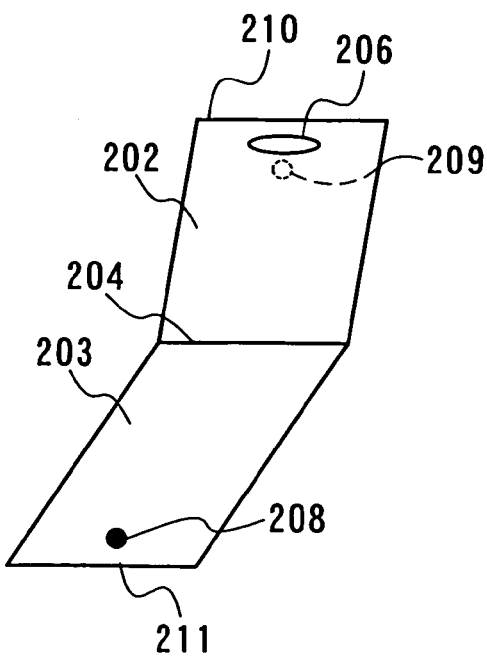
FIG. 21 is a schematic diagram showing a preferred example of a case where a folding mobile phone having a speaker at an upper part of a surface of an upper casing is provided with microphones arranged on each of a front surface of a lower casing and a rear surface of the upper casing.
Figure 22:
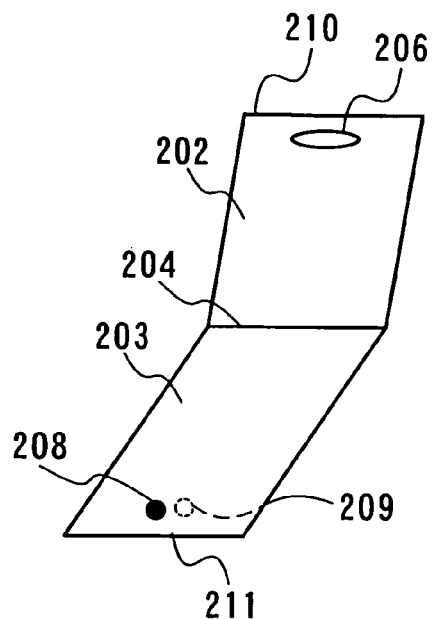
FIG. 22 is a schematic diagram showing a preferred example of a case where a folding mobile phone having a speaker at an upper part of a surface of an upper casing is provided with microphones arranged on each of a front surface of a lower casing and a rear surface of the lower casing.
Figure 23:
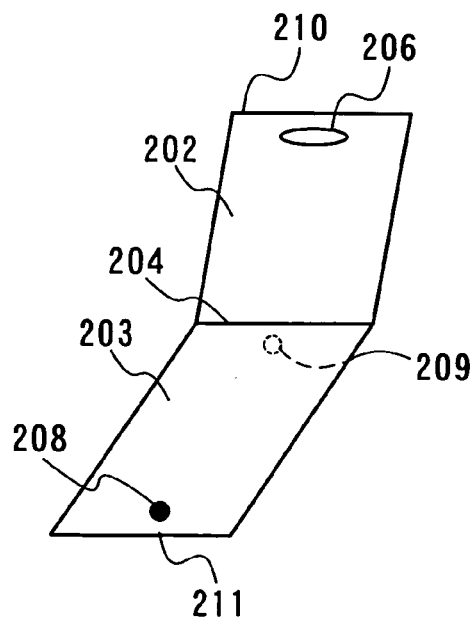
FIG. 23 is a schematic diagram showing a preferred example of a case where a folding mobile phone having a speaker at an upper part of a surface of an upper casing is provided with microphones arranged on each of a front surface of a lower casing and a rear surface of the lower casing.
Figure 24:
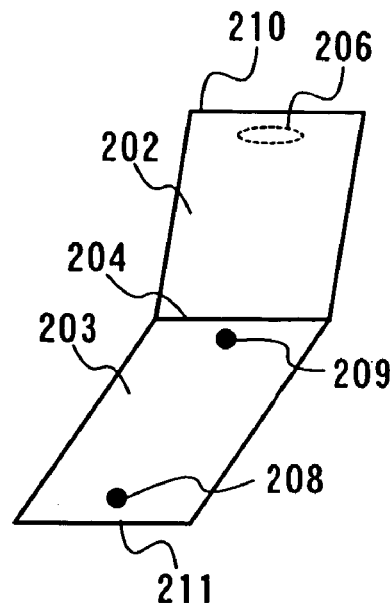
FIG. 24 is a schematic diagram showing a preferred example of a case where a folding mobile phone having a speaker on a rear surface of an upper casing has two microphones.
Figure 25:
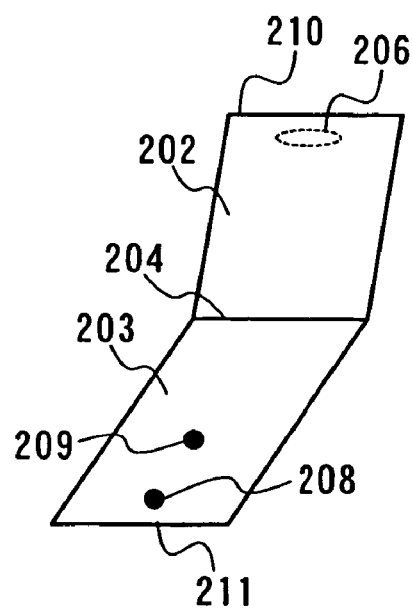
FIG. 25 is a schematic diagram showing a preferred example of a case where a folding mobile phone having a speaker on a rear surface of an upper casing has two microphones.
Figure 26:
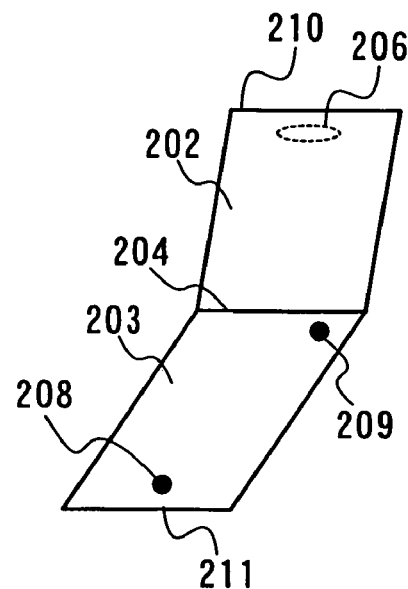
FIG. 26 is a schematic diagram showing a preferred example of a case where a folding mobile phone having a speaker on a rear surface of an upper casing has two microphones.
Figure 27:
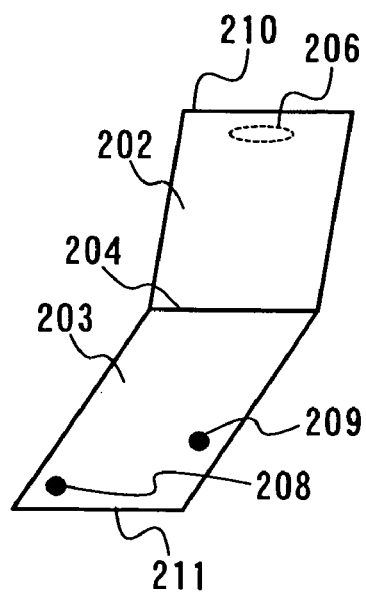
FIG. 27 is a schematic diagram showing a preferred example of a case where a folding mobile phone having a speaker on a rear surface of an upper casing has two microphones.

While in each specific example shown in FIGS. 10, 14, 15, 16 and 17 and FIGS. 18, 19 and 20, the two microphones 208 and 209 are disposed on the surfaces of the lower casing 203 and the upper casing 202, one of the microphones may be disposed on the rear surface of the lower casing 203 or the upper casing 202. FIGS. 21, 22 and 23 show examples of such arrangement. In FIG. 21, one microphone 208 is disposed in proximity to the end unit 211 of the lower casing 203 similarly to FIG. 10 and the other microphone 209 is disposed near the end unit 210 (position distant from the hinge 204) on the rear surface of the upper casing 202. In FIG. 22, one microphone 208 is disposed in proximity to the end unit 211 on the surface of the lower casing 203 and the other microphone 209 is disposed at a position just at the back of the microphone 208. It is as a matter of course possible to dispose the other microphone 209 not at the position just at the back of the microphone 208 but at another position, for example, on the side close to the hinge 204 as shown in FIG. 23.

When one of the two microphones is disposed on the upper surface of the mobile phone and the other on the rear surface as illustrated in FIGS. 21, 22 and 23, even the microphones having omnidirectivity whose characteristics are completely the same cause not a small phase error. It is therefore desirable to execute calibration by using, for example, the technique recited in Literature 1.

In the specific examples shown in FIG. 10, and FIG. 14 through FIG. 23, arrangement of the microphones has been described which enables sound collecting performance to be enhanced both in use as a handset and a hands-free phone. In a case of a mobile phone having a video telephone function, however, the mobile phone is expected to be used as a hands-free phone all the time or is expected to have another speaker for use as a hands-free phone. In this case, the speaker 206 can be disposed at an arbitrary position of the mobile phone. The present invention is applicable also to a mobile phone having the speaker 206 disposed at other position than the upper part of the surface of the upper casing 202. In the following, a specific example of microphone arrangement which enables sound collecting performance to be enhanced when used as a hands-free phone will be described.

Figure 28:
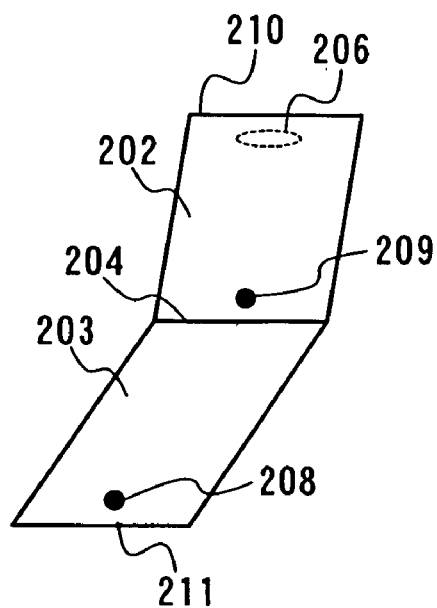
FIG. 28 is a schematic diagram showing a preferred example of a case where a folding mobile phone having a speaker on a rear surface of an upper casing has two microphones.
Figure 29:
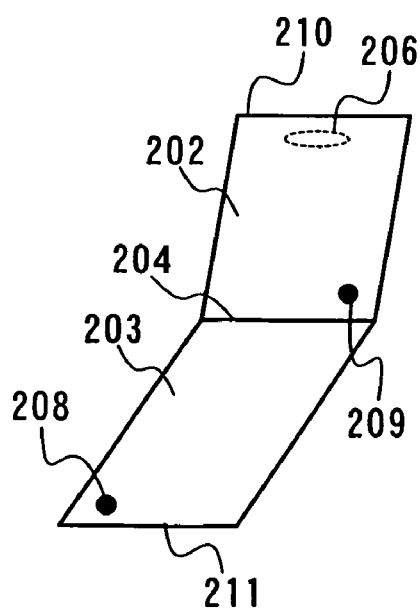
FIG. 29 is a schematic diagram showing a preferred example of a case where a folding mobile phone having a speaker on a rear surface of an upper casing has two microphones.
Figure 30:
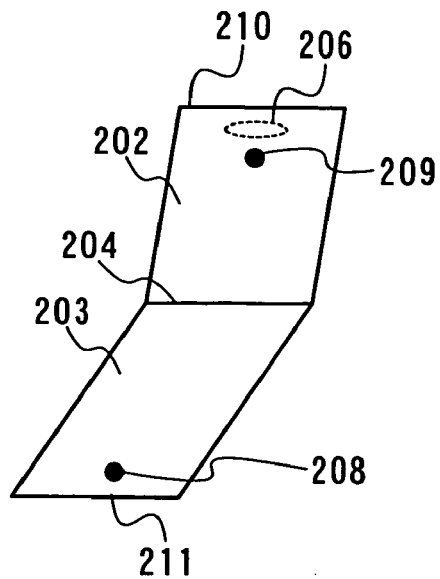
FIG. 30 is a schematic diagram showing a preferred example of a case where a folding mobile phone having a speaker on a rear surface of an upper casing has two microphones.
Figure 31:
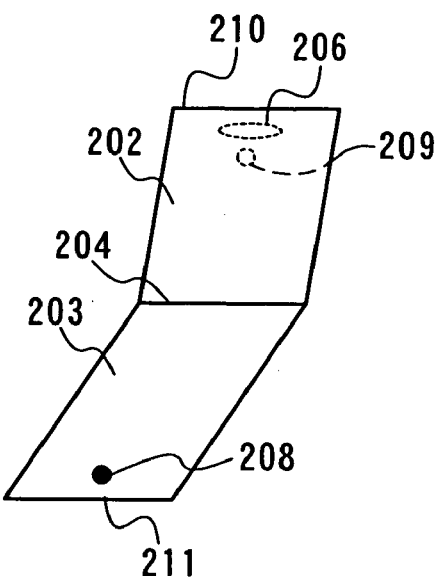
FIG. 31 is a schematic diagram showing a preferred example of a case where a folding mobile phone having a speaker on a rear surface of an upper casing has two microphones.
Figure 32:
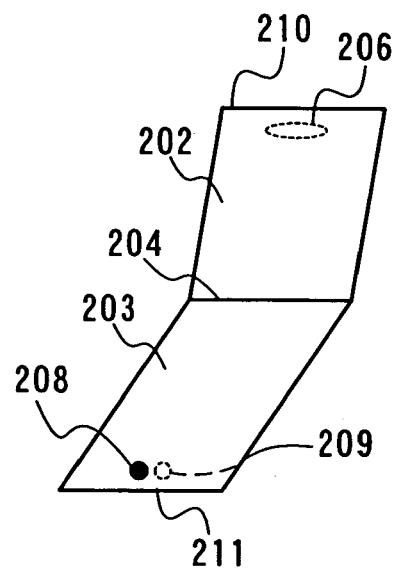
FIG. 32 is a schematic diagram showing a preferred example of a case where a folding mobile phone having a speaker on a rear surface of an upper casing has two microphones.
Figure 33:
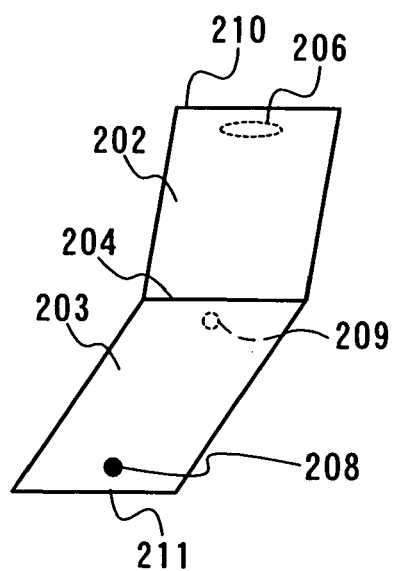
FIG. 33 is a schematic diagram showing a preferred example of a case where a folding mobile phone having a speaker on a rear surface of an upper casing has two microphones.

Examples of arrangement of a microphone applicable to the mobile phone having the speaker 206 disposed on the rear side of the upper casing 202 are shown in FIG. 24 through FIG. 33. FIG. 24 to FIG. 27 show arrangements of the two microphones 208 and 209 on the surface of the lower casing 203 similarly to FIG. 10 and FIGS. 14 to 16. FIGS. 28 to 30 show arrangements in which the microphones are disposed one each on the surface of the lower casing 203 and the surface of the upper casing 202 similarly to FIGS. 18 to 20, respectively. FIGS. 31 to 33 show arrangements in which one of the microphones is disposed on the rear surface of the lower casing 203 or the upper casing 202 similarly to FIGS. 21 to 23, respectively.

Figure 34:
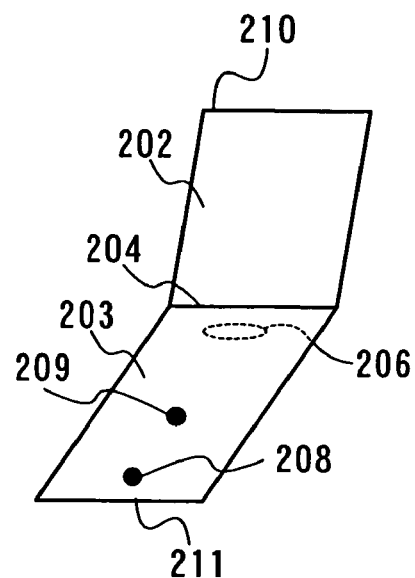
FIG. 34 is a schematic diagram showing a preferred example of a case where a folding mobile phone having a speaker on a rear surface of a lower casing has two microphones.
Figure 35:
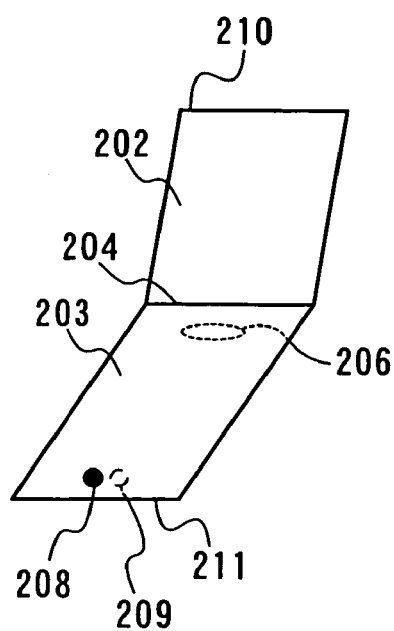
FIG. 35 is a schematic diagram showing a preferred example of a case where a folding mobile phone having a speaker on a rear surface of a lower casing has two microphones.
Figure 36:
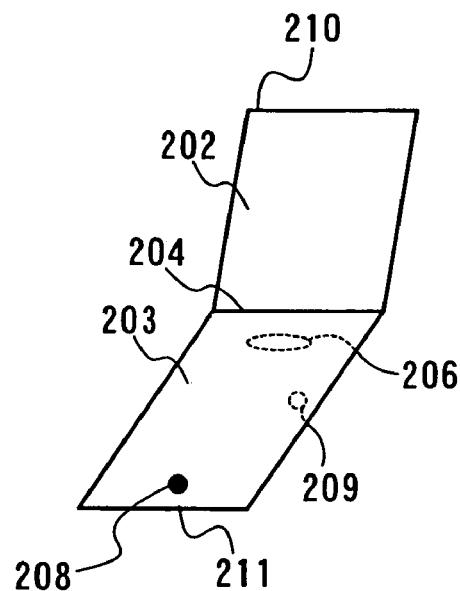
FIG. 36 is a schematic diagram showing a preferred example of a case where a folding mobile phone having a speaker on a rear surface of a lower casing has two microphones.
Figure 37:
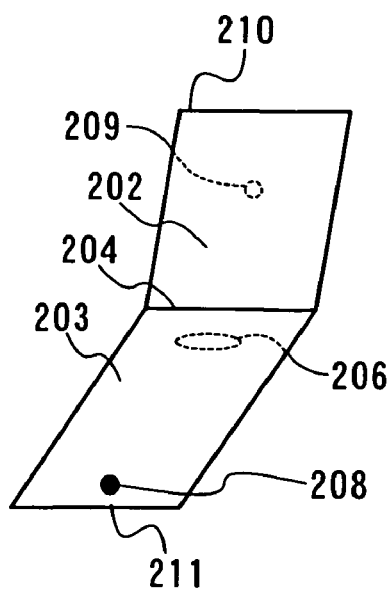
FIG. 37 is a schematic diagram showing a preferred example of a case where a folding mobile phone having a speaker on a rear surface of a lower casing has two microphones.
Figure 38:
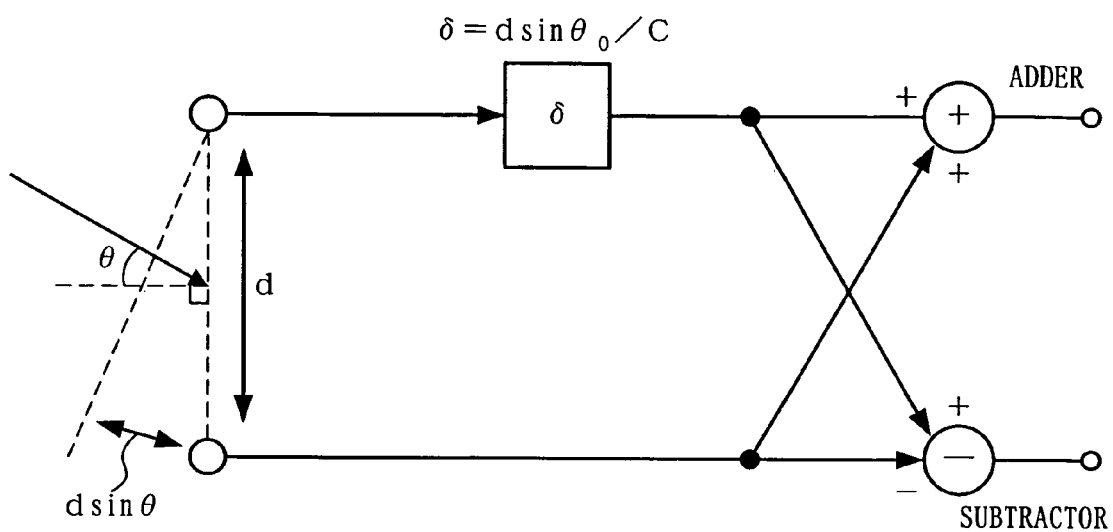
FIG. 38 is a diagram for use in explaining the principle of beam forming.

Examples of microphone arrangement applicable to the mobile phone having the speaker 206 disposed on the rear surface of the lower casing 203 are shown in FIGS. 34 through 37. FIG. 34 shows one example of arrangement of the two microphones 208 and 209 on the surface of the lower casing 203 similarly to FIG. 14. FIGS. 35 and 36 each shows one example of arrangement in which one microphone 208 is disposed on the surface of the lower casing 203 and the other microphone 209 on the rear surface of the lower casing 203 similarly to FIGS. 22 and 23. FIG. 37 shows one example of arrangement in which one microphone 208 is disposed on the surface of the lower casing 203 and the other microphone 209 on the surface of the upper casing 202 similarly to FIG. 21.

The foregoing specific examples have been described with respect to the examples of microphone arrangement obtained at the time when the present invention is applied to the folding mobile phones having the speaker disposed respectively on the front surface and the rear surface of the upper casing 202 and on the rear surface of the lower casing 203, speaker arrangement and microphone arrangement are not limited to the foregoing examples and any arrangement is possible in which the two microphones 208 and 209 are disposed such that the speaker 206 fails to locate at a position proximate to a conical surface formed, with a line segment linking the two microphones 208 and 209 as an axis, by rotating the half line extending from the middle point of the line segment toward the speaker's mouth. More precisely, it is only necessary that the two microphones 208 and 209 locate to prevent the speaker 206 from locating at a position proximate to such a hyperboloid as includes the position of the speaker's mouth with the two microphones 208 and 209 as fixed points.

Although the foregoing specific examples have been described with respect to the examples in which the present invention is applied to the folding mobile phones, the present invention is applicable also to a microphone array in a one-body mobile phone. In addition, the present invention is applicable also to other mobile terminal than a mobile phone such as a microphone array in a portable computer. The present invention is applicable not only to conversation through a telephone but also to a sound collecting microphone array for input for voice recognition, speaker recognition and identification of kind of sound. Although as a noise source, only a speaker which outputs voice of a speaking partner is taken into consideration, application is possible also to microphone arrangement taking other noise source such as a car stereo in a an automobile into consideration. Moreover, application is possible as well to a sonar and an array device in radio communication and the like.

In addition, while the modes of implementation and the specific examples of the present invention have been described premised on beam forming, the present invention is also applicable, not limited to beam forming, to a case where a non-linear method such as spectrum subtraction (e.g. post filter recited in Michael Brandstein and Darren Ward, "Microphone Arrays: Signal Processing Techniques and Applications", Springer-Verlog, 2001) is used because spatial relationship is the same.

As described in the foregoing, the present invention enables provision of an array device such as a microphone array which improves such performance as signal separation and noise removal through sensor arrangement and structure.

What is claimed is:

1. An array device comprising:
    a plurality of sensors which detect a signal of a target signal source;
    at least one noise source;
    a first circuit which generates, from an output signal of said plurality of sensors, a signal having first directivity which passes a signal arriving from a direction of said target signal source;
    a second circuit which generates, from the output signal of said plurality of sensors, a signal having second directivity which cuts off a signal arriving from the direction of said target signal source; and
    a third circuit which emphasizes a signal arriving from the direction of said target signal source by correcting an output signal of said first circuit by the output signal of said first circuit and an output signal of said second circuit, wherein
    said plurality of sensors are disposed so as to prevent said noise source from locating at a position of a null of said second directivity calculated by using the position of said plurality of sensors and the direction of said target signal source.

2. The array device as set forth in claim 1, wherein the number of said sensors is two and said two sensors are disposed so as to prevent said noise source from locating at a position proximate to a hyperboloid containing the position of said target signal source with the two sensors as fixed points.

3. The array device as set forth in claim 2, wherein the number of said sensors is three or more and said three or more sensors are disposed so as to prevent said noise source from locating at a position proximate to every hyperboloid containing the position of said target signal source with arbitrary two out of the sensors as fixed points.

4. The array device as set forth in claim 2, wherein the number of said sensors is two and said two sensors are disposed so as to prevent said noise source from locating at a position proximate to a conical surface formed, with a line segment linking the two sensors as an axis, by rotating a half line extending from the middle point of the line segment toward the direction of said target signal source.

5. The array device as set forth in claim 2, wherein the number of said sensors is three or more and said three or more sensors are disposed so as to prevent said noise source from locating at a position proximate to every conical surface formed, with a line segment linking arbitrary two out of the sensors as an axis, by rotating a half line extending from the middle point of the line segment toward the direction of said target signal source.

6. A mobile terminal having an array device including a plurality of sensors which detect a signal of a target signal source, at least one noise source, a first circuit which generates, from an output signal of said plurality of sensors, a signal having first directivity which passes a signal arriving from a direction of said target signal source, a second circuit which generates, from the output signal of said plurality of sensors, a signal having second directivity which cuts off a signal arriving from the direction of said target signal source, and a third circuit which emphasizes a signal arriving from the direction of said target signal source by correcting an output signal of said first circuit by the output signal of said first circuit and an output signal of said second circuit, wherein
    said plurality of sensors are disposed so as to prevent said noise source from locating at a position of a null of said second directivity calculated by using the position of said plurality of sensors and the direction of said target signal source, and
    said sensor is a voice sensor which collects transmitted voice and said noise source is a voice output unit which outputs received voice.

7. The mobile terminal as set forth in claim 6, which has a video telephone function.

8. The mobile terminal as set forth in claim 6, which has a structure in which an upper casing and a lower casing are foldably connected by a hinge.

9. The mobile terminal as set forth in claim 8, wherein with surfaces facing to each other when the upper casing and the lower casing are folded as front surfaces and the other surfaces as rear surfaces, said voice output unit is provided on the front surface of the upper casing.

10. The mobile terminal as set forth in claim 9, wherein two voice sensors are provided on the front surface of the lower casing.

11. The mobile terminal as set forth in claim 10, wherein with a direction orthogonal to a longitudinal direction of the hinge as a vertical direction, the two voice sensors are disposed vertically.

12. The mobile terminal as set forth in claim 9, wherein one voice sensor is provided on the front surface of the lower casing and other one voice sensor is provided on the front surface of the upper casing.

13. The mobile terminal as set forth in claim 9, wherein one voice sensor is provided on the rear surface of the upper casing and other one voice sensor is provided on the front surface of the lower casing.

14. The mobile terminal as set forth in claim 9, wherein the voice sensor is provided on both the front surface and the rear surface of the lower casing.

15. The mobile terminal as set forth in claim 8, wherein with surfaces facing to each other when the upper casing and the lower casing are folded as front surfaces and the other surfaces as rear surfaces, said voice output unit is provided on the rear surface of the upper casing.

16. The mobile terminal as set forth in claim 15, wherein two voice sensors are provided on the front surface of the lower casing.

17. The mobile terminal as set forth in claim 16, wherein with a direction orthogonal to a longitudinal direction of the hinge as a vertical direction, the two voice sensors are disposed vertically.

18. The mobile terminal as set forth in claim 15, wherein one voice sensor is provided on the front surface of the lower casing and other one voice sensor is provided on the front surface of the upper casing.

19. The mobile terminal as set forth in claim 15, wherein one voice sensor is provided on the rear surface of the upper casing and other one voice sensor is provided on the front surface of the lower casing.

20. The mobile terminal as set forth in claim 15, wherein the voice sensor is provided on both the front surface and the rear surface of the lower casing.

21. The mobile terminal as set forth in claim 8, wherein with surfaces facing to each other when the upper casing and the lower casing are folded as front surfaces and the other surfaces as rear surfaces, said voice output unit is provided on the rear surface of the lower casing.

22. The mobile terminal as set forth in claim 21, wherein two voice sensors are provided on the front surface of the lower casing.

23. The mobile terminal as set forth in claim 22, wherein with a direction orthogonal to a longitudinal direction of the hinge as a vertical direction, the two voice sensors are disposed vertically.

24. The mobile terminal as set forth in claim 21, wherein one voice sensor is provided on the rear surface of the upper casing and other one voice sensor is provided on the front surface of the lower casing.

25. The mobile terminal as set forth in claim 21, wherein the voice sensor is provided on both the front surface and the rear surface of the lower casing.

* * * * *